(12) United States Patent
Huang et al.

(10) Patent No.: US 6,263,003 B1
(45) Date of Patent: Jul. 17, 2001

(54) HIGH-POWER CLADDING-PUMPED BROADBAND FIBER SOURCE AND AMPLIFIER

(75) Inventors: Sidney Xi-Yi Huang, Westwood, NJ (US); Naveen Sarma, New York City, NY (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/191,797

(22) Filed: Nov. 13, 1998

Related U.S. Application Data

(63) Continuation-in-part of application No. 08/946,479, filed on Oct. 7, 1997, now abandoned.
(60) Provisional application No. 60/038,197, filed on Feb. 14, 1997.

(51) Int. Cl.$^7$ ............... H01S 3/30; H01S 3/00; G02B 6/02
(52) U.S. Cl. ............... 372/6; 385/123; 385/141; 359/341
(58) Field of Search ............... 372/6; 385/123, 385/141, 142; 359/341

(56) References Cited

U.S. PATENT DOCUMENTS

| | | | |
|---|---|---|---|
| 4,637,025 | 1/1987 | Snitzer et al. | 372/1 |
| 4,962,995 | 10/1990 | Andrews et al. | 350/96 |
| 5,170,458 | 12/1992 | Aoyagi et al. | 385/127 |
| 5,278,850 | 1/1994 | Ainslie et al . | 372/6 |
| 5,309,455 | 5/1994 | Adachi et al. | 372/25 |
| 5,319,652 | 6/1994 | Moeller | 312/6 |
| 5,373,576 | 12/1994 | Minns et al. | 385/125 |
| 5,412,672 | 5/1995 | Ainslie et al. | 372/6 |
| 5,473,622 | 12/1995 | Grubb | 372/6 |
| 5,491,581 * | 2/1996 | Roba | 359/341 |
| 5,530,709 | 6/1996 | Waarts et al. | 372/6 |
| 5,533,163 | 7/1996 | Muendel | 385/126 |
| 5,627,848 | 5/1997 | Fermann et al. | 372/18 |
| 5,657,153 | 8/1997 | Endriz et al. | 359/341 |
| 5,696,782 | 12/1997 | Harter et al. | 372/25 |
| 5,708,669 | 1/1998 | DiGiovanni et al. | 372/6 |
| 5,867,305 * | 2/1999 | Waarts et al. | 359/341 |
| 5,920,582 * | 7/1999 | Byron | 372/6 |
| 5,949,941 * | 9/1999 | DiGiovanni | 385/127 |
| 5,966,491 * | 10/1999 | DiGiovanni | 385/127 |

FOREIGN PATENT DOCUMENTS

| | | | |
|---|---|---|---|
| 0 533 324 A2 | 7/1992 | (EP) | H01S/3/17 |
| 0 867 986 A2 | 3/1998 | (EP) | H01S/3/06 |
| WO95/10868 | 4/1995 | (WO) | H01S/3/06 |
| WO98/36477 | 8/1998 | (WO) | H01S/3/091 |
| WO00/30223 | 5/2000 | (WO) | H01S/3/063 |

OTHER PUBLICATIONS

T. H. Weber, et al; A Longitudianl and Side–Pumped Single Transvers Mode Double–Clad Fiber Laser with a Special Silicone Coating; Mar. 1, 1995; vol. 15, No. 1; Optics Communications pp. 99–104.

Ch. Ghisler, et al; Cladding–pumping of a Tm:Hosilica Fibre Laser; Dec. 15, 1996; vol. 132, No. 5; Optics Communications pp. 475–476.

\* cited by examiner

*Primary Examiner*—Brian Healy
(74) *Attorney, Agent, or Firm*—Loria B. Yeadon

(57) ABSTRACT

A very high power fiber light source can be realized by using a high concentration of doping and by pumping the cladding of the doped fiber. The light that enters the cladding will then enter the core and amplified spontaneous emission will result. With this arrangement, higher power, a broader emission spectrum, and low radiation sensitivity can be achieved. These devices can also be configured as amplifiers.

21 Claims, 8 Drawing Sheets

HIGH-POWER CLADDING-PUMPED BROADBAND FIBER SOURCE AND AMPLIFIER

CROSS-REFERENCE TO RELATED APPLICATION

This is a continuation-in-part of application Ser. No. 08/946,479, filed Oct. 7, 1997, now abandoned, which claims the benefit of U.S. Provisional Application No. 60/038,197, filed Feb. 14, 1997, pending.

BACKGROUND OF THE INVENTION

In certain applications, such as fiber optic gyroscopes, a broadband, high-power light source is preferred. With a high power source, the deleterious effects of shot noise are lessened. Another desirable quality of a light source is radiation hardness (or low radiation sensitivity). This is important in applications in space and hostile environments. An ultrahigh power source with a doped fiber of very short lengths, e.g., approximately 0.1 to 10 meters in length, offers higher output power, a broadband emission spectrum, and superior radiation hardness, as radiation-induced darkening of a fiber is proportional to the length of the fiber.

DESCRIPTION OF THE INVENTION

Since the cross-sectional area of a fiber core is relatively small, illumination of the core alone by a laser diode array will result in a relatively minimal transfer of optical power. By illuminating the considerably larger cladding surrounding the core with a pump source of a first wavelength, such as a laser diode array, a greater quantity of light, and hence more optical power, can be coupled into the fiber.

The light energy first enters the cladding, which may comprise one or more cladding layers, reflecting off the outer boundaries of the cladding as the light travels the length of the fiber, and passes repeatedly through the core by refraction at the interface of the cladding and the core. As the light passes through the core, the doped material absorbs the light energy. The pumping of light energy into the core, in the form of photons, results in amplified spontaneous emission of broadband light distributed about a second wavelength.

Figure 1:
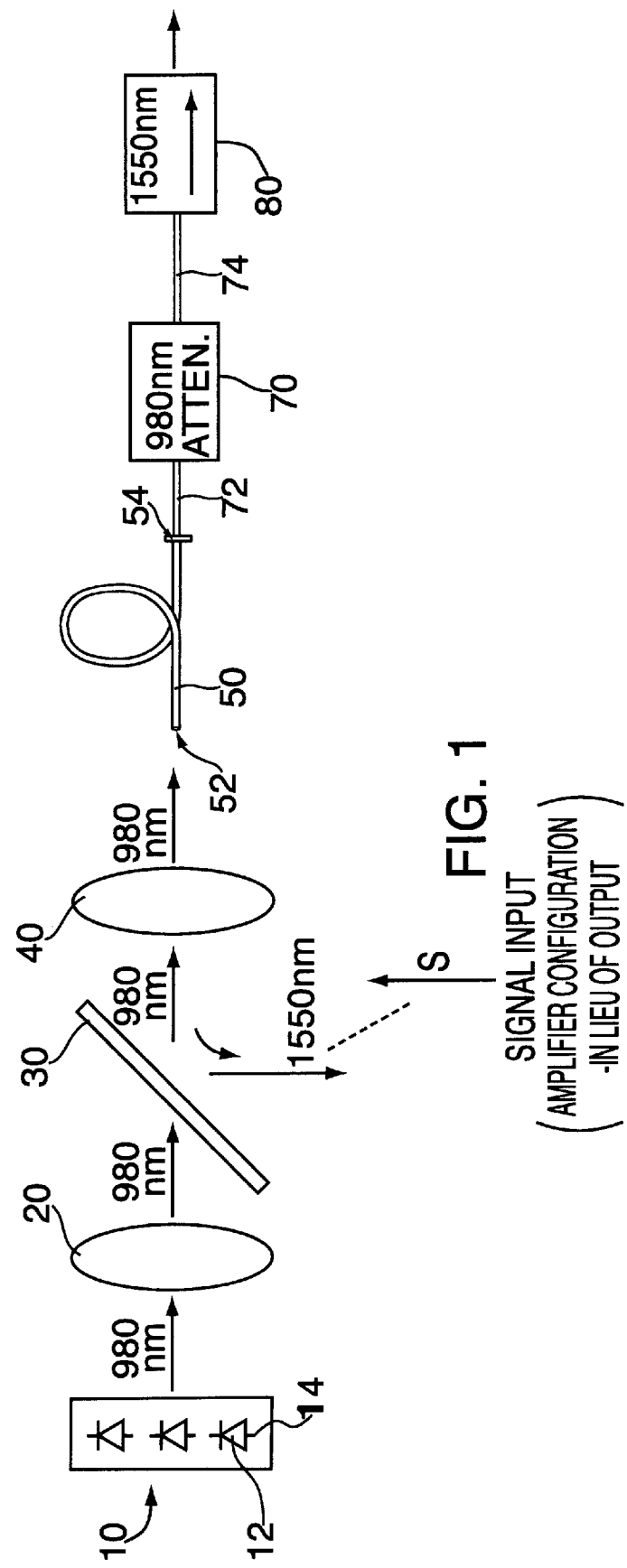
FIG. 1 is a schematic diagram of a fiber light source.

One configuration of a light source is shown in the schematic diagram of FIG. 1. It has a laser diode array 10 of laser diode elements 12 on a substrate 14. The wavelength of the light output of the laser diode array 10 is dependent on the particular diodes in the array 10. In the example shown in FIG. 1, the wavelength is 980 nm, but other wavelengths could be utilized as required by the application and the other components of the light source.

The output is directed through a collimating lens 20. An aspheric lens, a spherical ball lens, or any other lens that collimates a divergent beam can be employed as the collimating lens 20. The collimated light is then directed through a dichroic reflector 30, oriented here at a 45° angle with respect to the light path and having a pass wavelength corresponding to the wavelength of the light output of the laser diode array 10. Here, the dichroic reflector 30 passes the component of light having a wavelength of 980 nm but reflects light of other wavelengths.

The light passing through the dichroic reflector 30 is directed through a first focusing lens 40. A lens that will focus a collimated beam, for example, a double-convex lens, can be utilized for the first focusing lens 40. The lens is chosen such that the numerical aperture of the focused beam matches the numerical aperture of the target object, which as explained below is the cladding of the optical fiber.

The output of the first focusing lens 40 is provided to a co-doped silica fiber 50. To achieve high efficiency with a very short fiber, high levels of co-dopant concentrations are employed. Dopants can include combinations of rare earth elements such as erbium-ytterbium-aluminum (Er/Yb/Al) or erbium-ytterbium-phosphorous (Er/Yb/P). The concentrations of the dopants can be used in the following ranges: erbium: 700–900 ppm; ytterbium: 16,000–23,000 ppm; and aluminum or phosphorus in concentrations as large as possible. In actual usage, alumina can be used to supply the aluminum component. The ratio of ytterbium to erbium should be approximately 22:1, but can range from 18:1 to 26:1. For example, the core 60 can have co-dopant concentrations of approximately 800 ppm of erbium, approximately 18,000 ppm of ytterbium, and greater than 6 Mol % of alumina or greater than 12% of phosphorus.

The high concentration of ytterbium greatly increases the absorption rate of the pumped light on account of the concomitant increase in the absorption cross-section and dopant solubility of ytterbium. The ytterbium ions absorb the pumped light and the energy and then transfer it to the erbium ions by cross-relaxation between the erbium and ytterbium ions. Additional dopants including non-rare earth elements such as aluminum and phosphorus broaden the emission spectrum of the light energy output. Alternatively, erbium and ytterbium may be combined with a material other than aluminum or phosphorus that will broaden the output spectrum. In addition to erbium and ytterbium, other rare earth dopants include thulium (Tm), lanthanum (La), praseodymium (Pr), and samarium (Sm).

The fiber 50 is preferably very short, approximately 0.1–10 meters in length, preferably 0.25–5 meters in length, and optimally a length of 0.5–1 meter. As illustrated in the cross-sectional drawing of FIG. 2, the fiber 50 has a first end 52, a core 60, a first cladding layer 64, a second cladding layer 66, and an outer protective plastic jacketing 68. The first cladding layer 64 can be fabricated from silica and has an index of refraction less than that of the core 60, but greater than that of the second cladding layer 66. The first cladding layer 64 can have a cross-sectional area approximately 100 times the cross-sectional area of the core 60. The cladding layer 64 here has a rectangular cross-section to conform to the configuration of the laser diode array 10, but it should be understood that a square cross-section, a circular cross-section, or any other suitable cross-section could be employed.

The light from the first focusing lens 40 is pumped into a first end 52 of the fiber 50. Specifically, the 980 nm light is focused on the first cladding layer 64 of the fiber 50. The 980 nm light is coupled into the core 60 of the fiber as a result of repeated reflection within the first cladding layer 64 along the length of the fiber 50 causing the light to pass repeatedly by refraction through the core 60. Once in the core, the 980 nm light is absorbed by the erbium and ytterbium ions. Light at a wavelength of 1550 nm is then spontaneously emitted by the erbium ions in the core 60. Since the erbium ions spontaneously emit light in all directions, 1550 nm-wavelength light will emerge from both the first and second ends 52 and 54 of the fiber 50.

Referring again to FIG. 1, light output can be taken at the second end 54 of the fiber 50, this time from the core 60. The second end 54 is spliced, by a fusion splice or mechanical splice, to an in-line variable attenuator 70 through a single-mode fiber input 72. The attenuator 70 is tuned to attenuate light having a wavelength of 980 nm, while passing light having a wavelength of 1550 nm to a single-mode fiber output 74. Alternatively, a dichroic reflector that will pass 1550 nm wavelength light and reflect 980 nm light and oriented at a 45° angle (or some other suitable angle) with respect to the light path to discard the 980 nm light can be substituted for the attenuator 70. An optical isolator 80 spliced (by fusion or mechanically) to the single-mode fiber output 74 passes the 1550 nm wavelength light and prevents it traveling back into the fiber 50.

Figure 3:
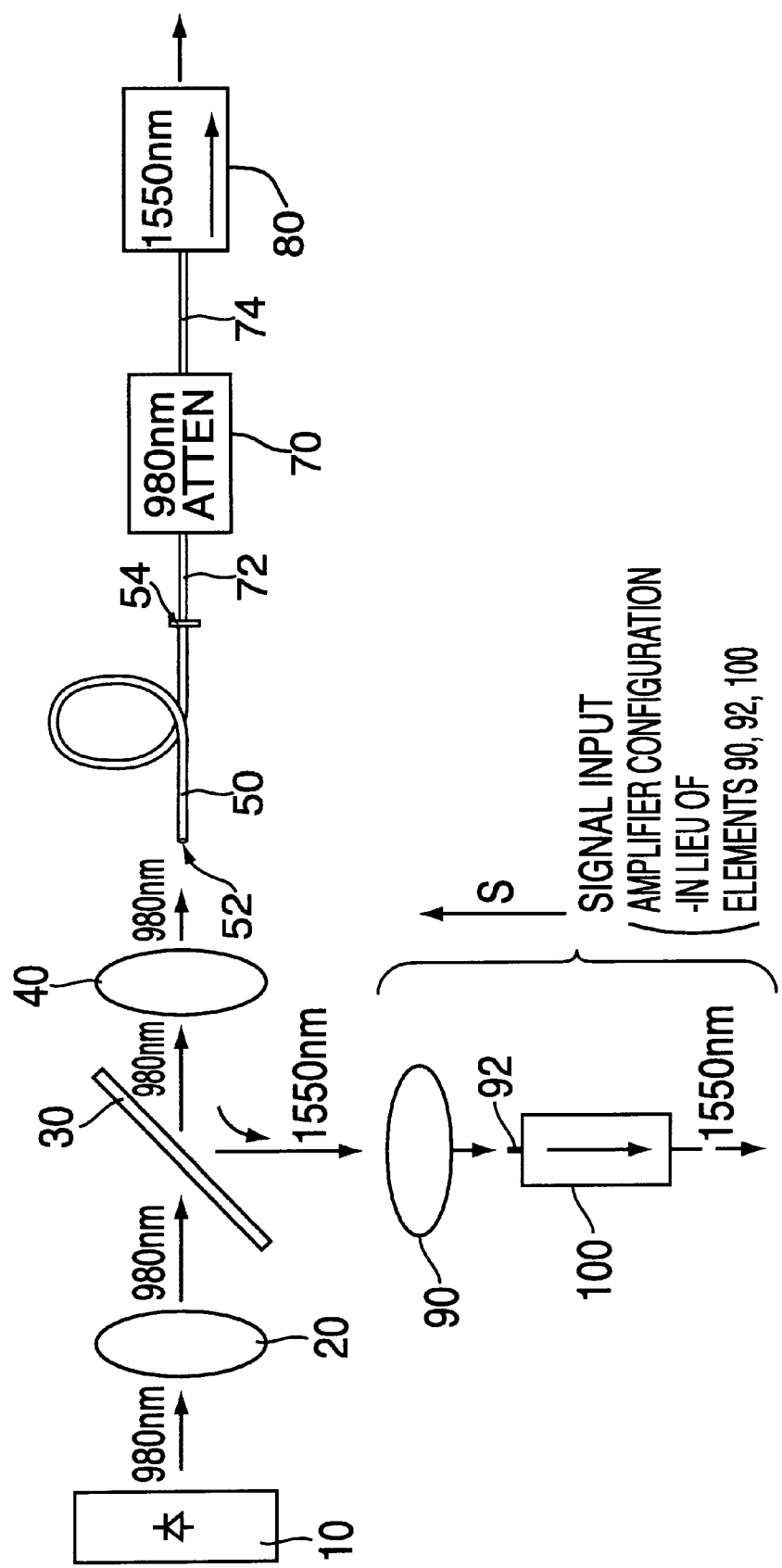
FIGS. 3–6 are schematic diagrams of alternative fiber light sources.

The fiber source of FIG. 1 can also provide an output of 1550 nm wavelength light from the first end 52 of the fiber 50, as the 1550 nm light emitted by the fiber 50 also travels back towards the first focusing lens 40. This component is collimated by the first focusing lens 40 and then reflected off the dichroic reflector 30. As shown in FIG. 3, a second focusing lens 90 to focus the light into a single-mode fiber 92 spliced to an optical isolator 100 can be provided to channel the 1550 nm light. The isolator 100 prevents 1550 nm wavelength light from passing back into the fiber 50.

Figure 4:
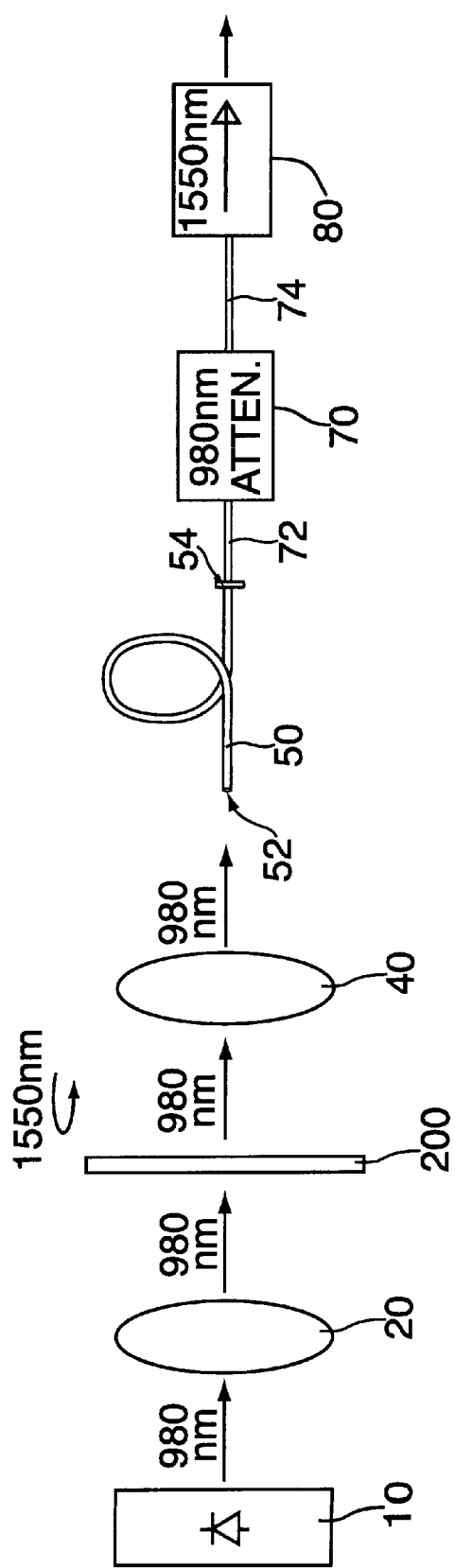
Figure 5:
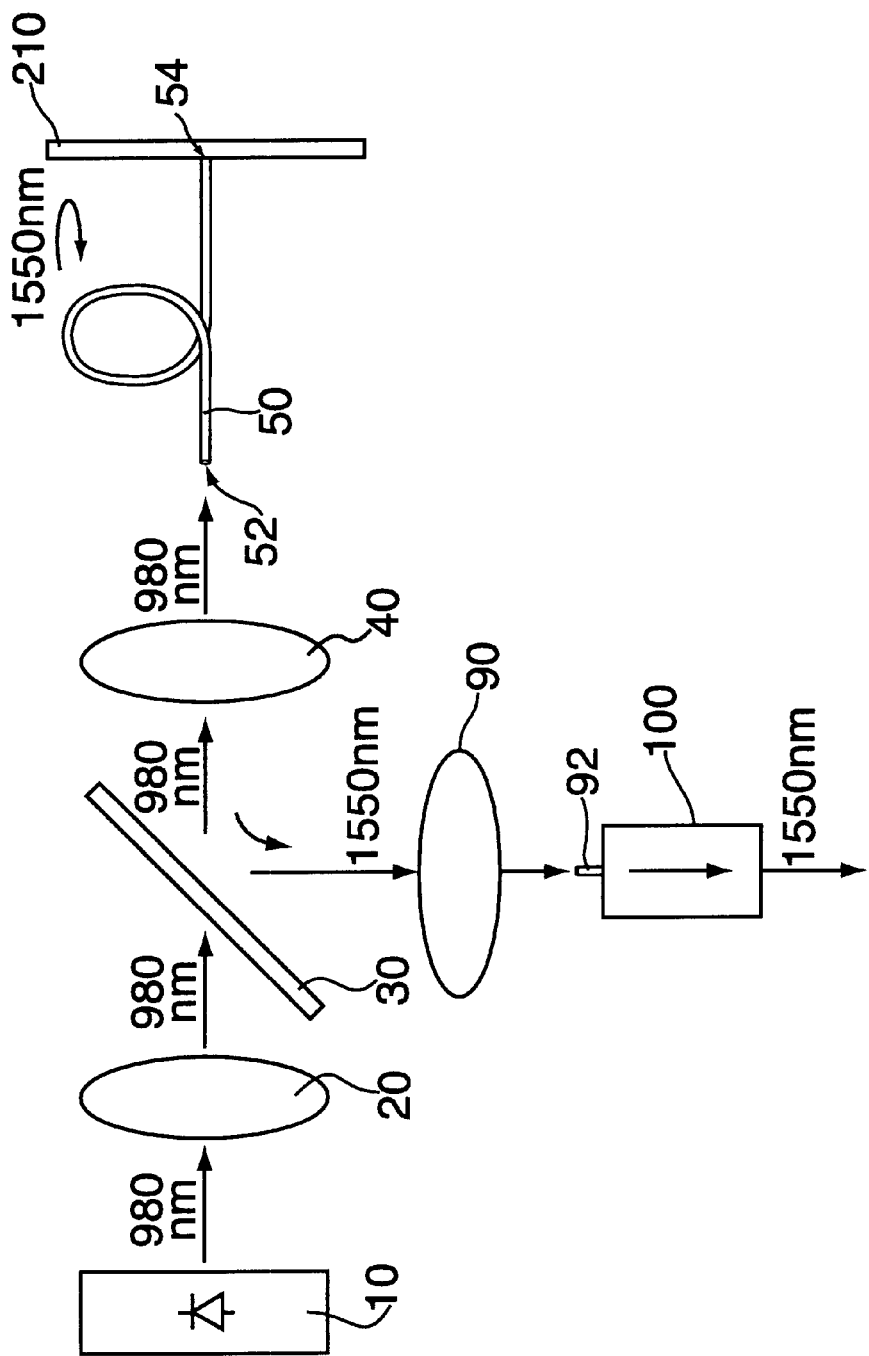

The configurations of FIGS. 1 and 3 are bidirectional—they will produce an output at both the first and second ends 52 and 54. As a further variation, dichroic reflectors could be inserted before or after the fiber 50 to restrict output to a single direction, either forward or backward (with respect to the initial direction of travel of the pumped 980 nm light) and increase the optical power output that exits at a single point, i.e., one end of the fiber 50 or the other. In FIG. 4, a second dichroic reflector 200 having a pass wavelength of 980 nm will reflect 1550 nm wavelength light back into the fiber 50. Alternatively, as illustrated in FIG. 5, a dichroic filter 210 could be positioned at the second end 54 of the fiber 50, reflecting 1550 nm wavelength light back into the fiber 50 so that it will combine with the light exiting through the first end 52.

Figure 6:
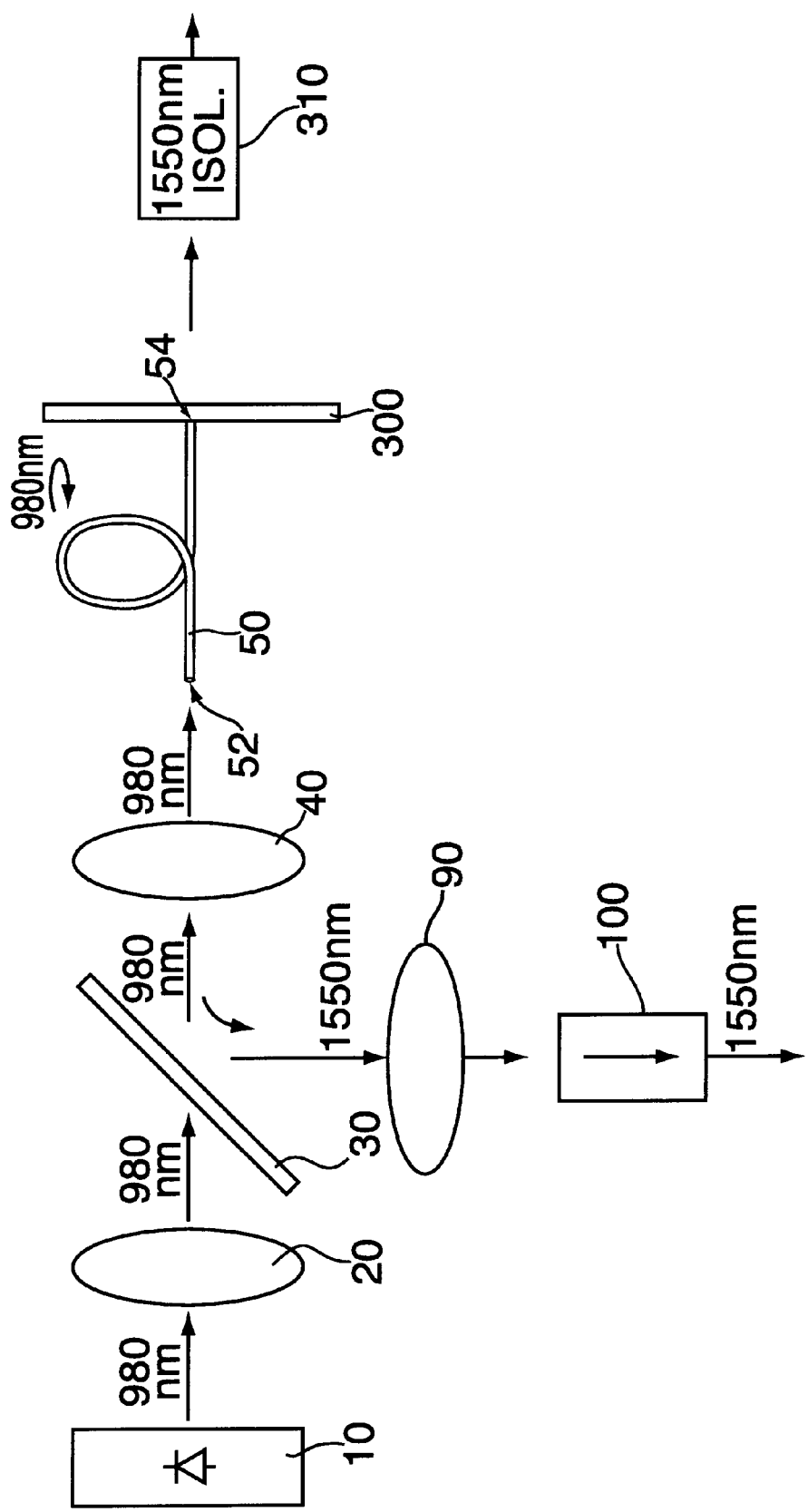

Not all of the 980 nm wavelength light from the laser diode array 10 may be absorbed in the core 60. To further increase the output of the light source, a 980 nm dichroic filter can be employed to recycle the 980 nm light. As illustrated in FIG. 6, a dichroic filter 300 that reflects 980 nm wavelength light is placed at the second end 54 of the fiber 50. When any 980 nm light reaches the dichroic filter 300, it is reflected back into the fiber 50 where it can be absorbed into the core 60. Optionally, 1550 nm light can be taken from the second end 54, for which a 1550 nm isolator 310 is provided, or at the first end from the optional optical isolator 100 following the second focusing lens 90, or from both ends. Alternatively, a mirror or reflector could be substituted for the dichroic filter 210, sending both the 980 nm and 1550 nm light back into the fiber 50. In this arrangement, the 980 nm would be reabsorbed into the fiber 50 and the 1550 nm light output would be taken from the first end 52.

The sources of FIGS. 1, 3, and 6 can be utilized as amplifiers. Instead of taking an output from the energy reflected off the dichroic filters (element 30), a signal input S accepts the input to be amplified and the amplified signal is then taken from the 1550 nm isolator (element 80 in FIGS. 1 and 3; element 310 in FIG. 6). In FIG. 1, the input signal is applied directly to the dichroic filter 30. In the case of the source of FIG. 3, the input S is substituted for the second focusing lens 90, the single-mode fiber 92, and the optical isolator 100. Similarly, in FIG. 6, the input S is substituted for the second focusing lens 90 and the optical isolator 100.

Figure 2:
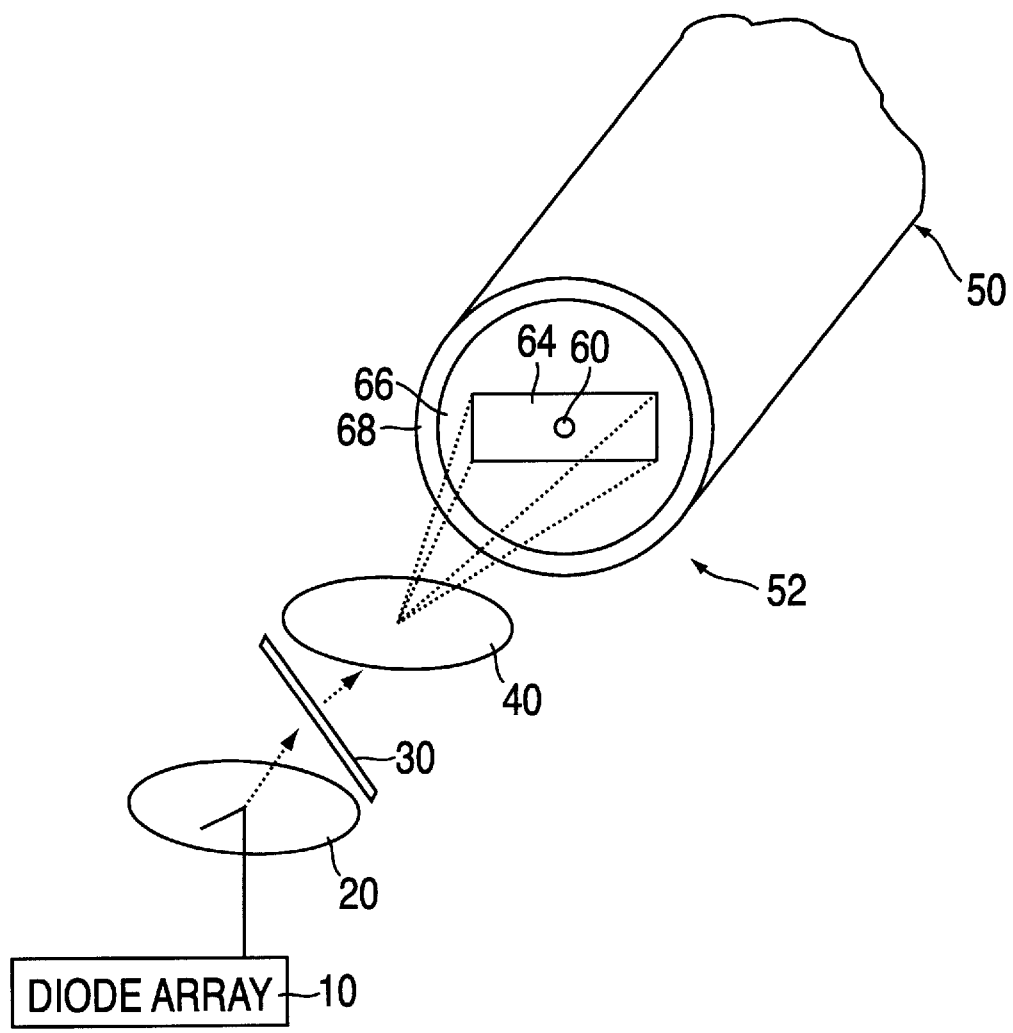
FIG. 2 is a partial perspective cross-sectional diagram of the fiber and certain components.
Figure 7:
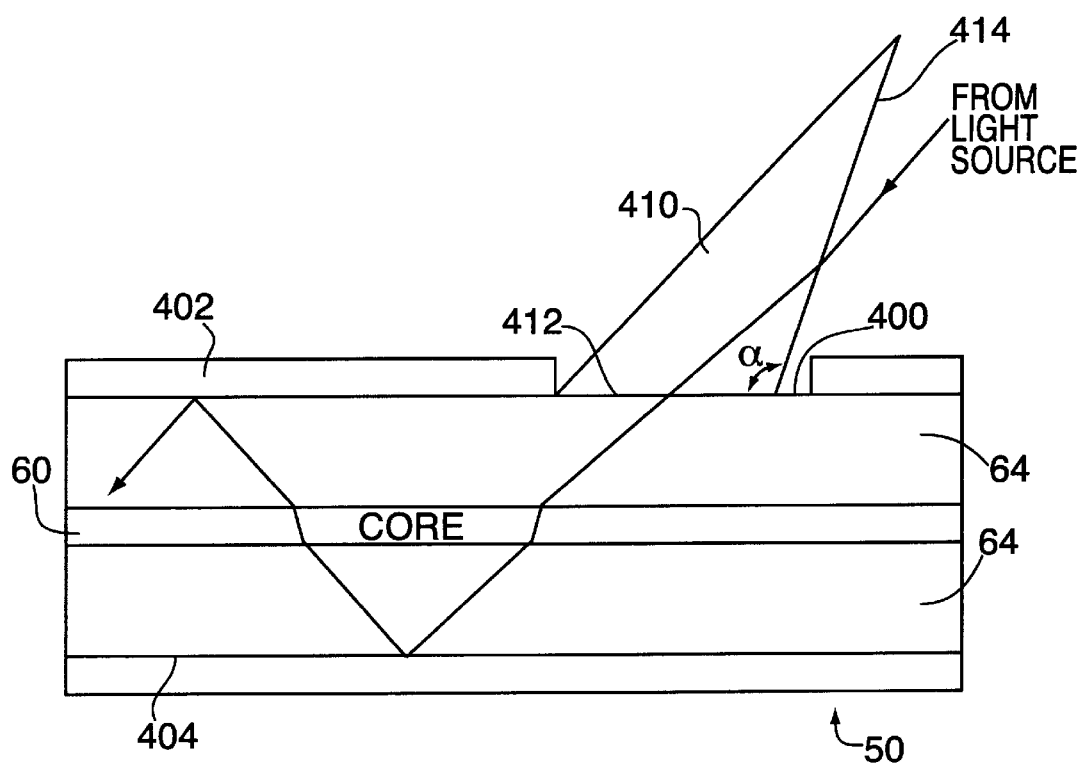
FIG. 7 is a cross-sectional schematic diagram of an alternative arrangement for coupling light energy into a fiber.

In FIG. 2, the light energy from the laser diode array 10 is pumped into the cladding layer 64 from one end of the fiber 50. The light energy may also be pumped into the cladding from the side of the fiber 50. As shown in FIG. 7, the outer boundary 400 of the first cladding layer 64 is exposed and a prism 410 is placed adjacent the boundary 400. (The other cladding layers and the outer protective plastic jacketing is shown schematically as a single layer 402 adjacent to the first cladding layer 64.) It should be recognized that the prism 410 could also be placed at the outer boundary of a second, third, or other cladding layer.

The prism 410 is fabricated from a material having the same index of refraction as the cladding 64 so that the light energy passes from the prism 410 and into the cladding 64 without refraction. The cladding 64 in this case can have a circular, square, or rectangular cross-section, or any other suitable cross-section. The base 412 of the prism 410 in contact with the cladding 64 would have a conforming shape and a length of approximately 1 mm, but other lengths could be employed. An optical adhesive having the same index of refraction as the prism 410 and the cladding 64 could be used to provide a continuous interface between the prism 410 and the cladding 64. To the extent there would be any significant gaps between the two surfaces, the optical adhesive may be used as a non-refractive filler and continuum.

Light energy from the light source would enter the prism 410 through an input face 414. The angle $\alpha$ between the base 412 and the input face 414 should be sufficiently large such that the light energy passing through the core 60 will be totally internally reflected by the opposite boundary 404 of the cladding 64. For example, an angle of 116° will insure that there will be total internal reflection, while allowing for refraction into the prism 410 and refraction as the light passes through the core 60.

Figure 8:
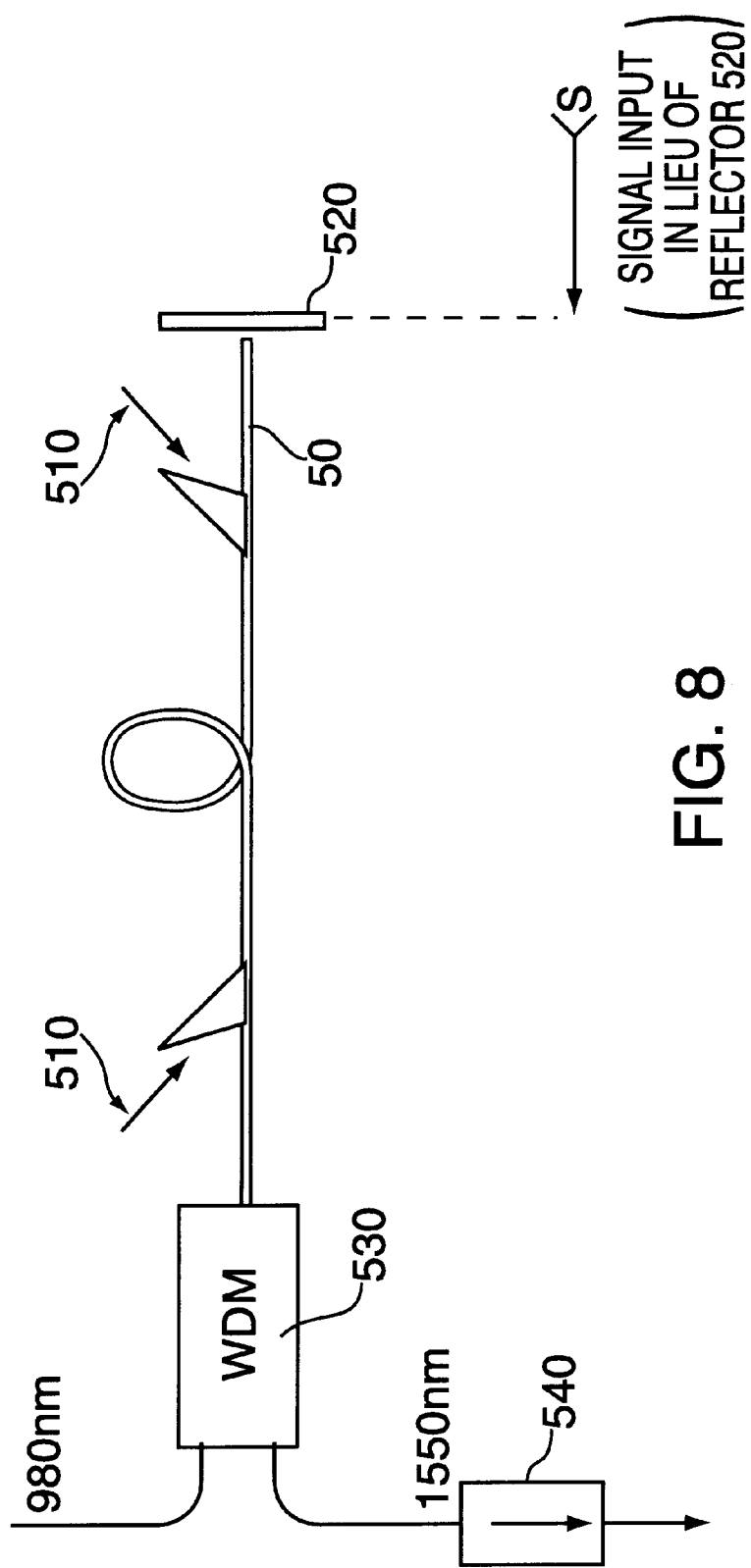
FIG. 8 is a schematic diagram of a fiber light source incorporating the arrangement of FIG. 7.

A fiber light source incorporating the arrangement illustrated in FIG. 7 is shown in FIG. 8. The fiber 50 has two or more light sources 510 that pump light into the cladding from the side of the fiber 50. Alternatively, a single source can be channelled into the fiber 50 at two points on the fiber 50. One end of the fiber 50 can terminate in an optional reflector 520, which will reflect all energy back into the fiber 50. A wavelength division multiplexer 530 at the other end separates the pumped wavelength energy, e.g., 980 nm, from the emitted wavelength energy (1550 nm) into two separate paths exiting the multiplexer 530. The 1550 nm energy can pass through an optional optical isolator 540 while the 980 nm energy not absorbed by the fiber 50.

The device of FIG. 8 can also be configured as an amplifier. In lieu of the optional reflector 520, a input signal S is fed into the core of the fiber 50. The input signal S should have a wavelength within the emission spectrum of the fiber 50, 1550 nm in the example discussed above. The device can be further modified to have only a single pump source 510. The output is taken from the output of the isolator 540.

The fiber 50 could have more than two cladding layers to accommodate larger laser diode arrays. In such a case, the respective refractive indices of the cladding layers would increase from the outermost layer to the core 60. Furthermore, the indices of refraction can be optimized to permit the greatest transfer of energy from one layer to the next, and ultimately across all of the layers. The pump light source could be focused on one or more of the intermediate cladding layers, such as the one adjacent the outermost cladding layer.

The foregoing devices can be assembled using materials, components, and techniques well known to those skilled in the art. Specific parameters for diode array, the lenses, the dichroic reflectors, the fiber, the attenuators, the isolators, and the multiplexers are a matter of design choice and will depend on the specific application.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A light source, comprising:
   a short, rare earth, ion-doped fiber comprising a core and at least one cladding layer;
   a source of light of a first wavelength;
   means for pumping the light of a first wavelength into a cladding layer, by directing the light through a prism adjacent the cladding layer into an outer boundary of the cladding layer; and
   means for extracting light of a second wavelength from the fiber.

2. A light source as set forth in claim 1, where the rare earth-ion dopants include erbium and ytterbium.

3. A light source as set forth in claim 2, where the core is further doped with spectrum-broadening dopants.

4. A light source as set forth in claim 3, where the dopants are non-rare earth elements including aluminum and/or phosphorus.

5. A light source as set forth in claim 1, where the fiber is approximately 0.1 to 10 meters in length.

6. A light source as set forth in claim 1, where the means for pumping comprises means for directing and focusing the light on the cladding layer.

7. A light source as set forth in claim 1, where the cladding layer comprises a plurality of cladding layers, where each cladding layer has a unique index of refraction and the means for pumping is focused on at least one of the cladding layers.

8. A light source as set forth in claim 7, where the indices of refraction are optimized for maximum energy transfer across all of the cladding layers.

9. A light source as set forth in claim 1, where the means for extracting light comprises means for extracting light from either or both ends of the fiber.

10. A light source as set forth in claim 1, further comprising reflecting means for recycling light of the first wavelength not absorbed by the core and/or reflecting means for reflecting light of the second wavelength back into the fiber.

11. A fiber optic light source, comprising:
    a fiber comprising a core and at least one cladding layer, where the core is co-doped with erbium, ytterbium, and aluminum and/or phosphorous and the fiber is approximately 0.1 to 10 meters in length;
    a source of light of a first wavelength;
    means for pumping the light of a first wavelength into a cladding layer, by directing the light through a prism adjacent the cladding layer into an outer boundary of the cladding layer; and
    means for extracting light of a second wavelength from the fiber from either or both ends of the fiber.

12. A fiber optic light source as set forth in claim 11, where the means for pumping the light of a first wavelength into the cladding layer comprises at least one means for pumping the light into the cladding and the means for extracting light of a second wavelength from the fiber comprises wavelength division means for separating the light of a first wavelength from the light of a second wavelength.

13. A fiber optic light source as set forth in claim 11, further comprising a dichroic filter or reflector positioned at the second end of the fiber for recycling light of the first wavelength not absorbed by the core.

14. A method of generating light in a short, rare earth, ion-doped fiber comprising a core and at least one cladding layer, comprising the steps of:
    pumping light from a source of light of a first wavelength into a cladding layer, by directing the light through a prism adjacent the cladding layer into an outer boundary of the cladding layer; and
    extracting light of a second wavelength from the fiber.

15. A method as set forth in claim 14, where step of pumping comprises the steps of directing and focusing the light on the cladding layer.

16. A method as set forth in claim 14, where step of extracting light comprises the step of extracting light from either or both ends of the fiber.

17. A method as set forth in claim 14, further comprising the step of recycling light of the first wavelength not absorbed by the core and/or the step of reflecting light of the second wavelength back into the fiber.

18. A method of generating light in a co-doped fiber comprising a core and at least one cladding layer, where the core is co-doped with erbium, ytterbium, and aluminum and/or phosphorous and the fiber is approximately 0.1 to 10 meters in length, comprising the steps of:
    pumping light from a source of light of a first wavelength into a cladding layer, by directing the light through a prism adjacent the cladding layer into an outer boundary of the cladding layer; and
    extracting light of a second wavelength from the fiber from either or both ends of the fiber.

19. A method as set forth in claim 18, further comprising the step of recycling light of the first wavelength not absorbed by the core.

20. An amplifier, comprising:
    a short, rare earth, ion-doped fiber comprising a core and at least one cladding layer;
    a source of light of a first wavelength;
    means for pumping the light of a first wavelength into a cladding layer, by directing the light through a prism adjacent the cladding layer into an outer boundary of the cladding layer;
    means for accepting an input signal of a second wavelength into the core of the fiber; and
    means for extracting the amplified signal from the fiber.

21. A method of amplifying light in a short, rare earth, ion-doped fiber comprising a core and at least one cladding layer, comprising the steps of:
    pumping light from a source of light of a first wavelength into a cladding layer, by directing the light through a prism adjacent the cladding layer into an outer boundary of the cladding layer;
    accepting an input signal of a second wavelength in to the core of the fiber;
    extracting the amplified signal from the fiber; and
    extracting light of a second wavelength from the fiber.

* * * * *

UNITED STATES PATENT AND TRADEMARK OFFICE
CERTIFICATE OF CORRECTION

PATENT NO. : 6,263,003 B1
DATED : July 17, 2001
INVENTOR(S) : Sidney Xi-Yi Huang et al.

Page 1 of 2

It is certified that error appears in the above-identified patent and that said Letters Patent is hereby corrected as shown below:

<u>Column 5, line 6 - Column 6, line 61,</u>
Replace (claims 1-21) with claims 1-7, as follows:

1. A light source, comprising:

a short, rare earth, ion-doped fiber comprising a core and a plurality of cladding layers, where each cladding layer has a unique index of refraction;

a source of light of a first wavelength;

means for pumping the light of a first wavelength into the cladding layers, by directing the light through a prism adjacent the cladding layers into an outer boundary of a cladding layer, the means for pumping being focused on at least one of the cladding layers; and means for extracting light of a second wavelength from the fiber.

2. A light source as set forth in claim 1, wherein the indices of refraction are optimized for maximum energy transfer across all of the cladding layers.

3. A light source as set forth in claim 1, wherein the means for extracting light comprises means for extracting light form either or both ends of the fiber.

4. A light source, comprising:

a short, rare earth, ion-doped fiber comprising a core and at least one cladding layer;

a source of light of a first wavelength;

means for pumping the light of a first wavelength into a cladding layer, by directing the light through a prism adjacent the cladding layer into an outer boundary of the cladding layer;

means for extracting light of a second wavelength from the fiber; and reflecting means for recycling light of the first wavelength not absorbed by the core and/or reflecting means for reflecting light of the second wavelength back into the fiber.

5. A fiber optic light source, comprising:

a fiber comprising a core and at least one cladding layer, where the core is co-doped with erbium, ytterbium, and aluminum and/or phosphorous and the fiber is approximately 0.1 to 10 meters in length;

a source of light of a first wavelength;

UNITED STATES PATENT AND TRADEMARK OFFICE
CERTIFICATE OF CORRECTION

PATENT NO. : 6,263,003 B1
DATED : July 17, 2001
INVENTOR(S) : Sidney Xi-Yi Huang et al.

It is certified that error appears in the above-identified patent and that said Letters Patent is hereby corrected as shown below:

means for pumping the light of a first wavelength into a cladding layer, by directing the light through a prism adjacent the cladding layer into an outer boundary of the cladding layer;

means for extracting light of a second wavelength from the fiber from either or both ends of the fiber; and a dichroic filter or reflector positioned at the second end of the fiber for recycling light of the first wavelength not absorbed by the core.

6. A method of generating light in a short, rare earth, ion-doped fiber comprising a core and at least one cladding layer, comprising the steps of:

pumping light from a source light of a first wavelength into a cladding layer;

extracting light of a second wavelength from the fiber; and recycling light of the first wavelength not absorbed by the core and/or the step of reflecting light of the second wavelength back into the fiber.

7. A method of generating light in a co-doped fiber comprising a core and at least one cladding layer where the core is co-doped with erbium, ytterbium, and aluminum and/or phosphorous and the fiber is approximately 0.1 to 10 meters in length, comprising the steps of:

pumping the light from a source of light of a first wavelength into a cladding layer, by directing the light through a prism adjacent the cladding layer into an outer boundary of the cladding layer;

extracting light of a second wavelength from the fiber from either or both ends of the fiber; and recycling light of the first wavelength not absorbed by the core.

Signed and Sealed this

Twenty-seventh Day of May, 2003

JAMES E. ROGAN
*Director of the United States Patent and Trademark Office*